U. DUCHESNE.
COASTER BRAKE.
APPLICATION FILED JAN. 24, 1920.

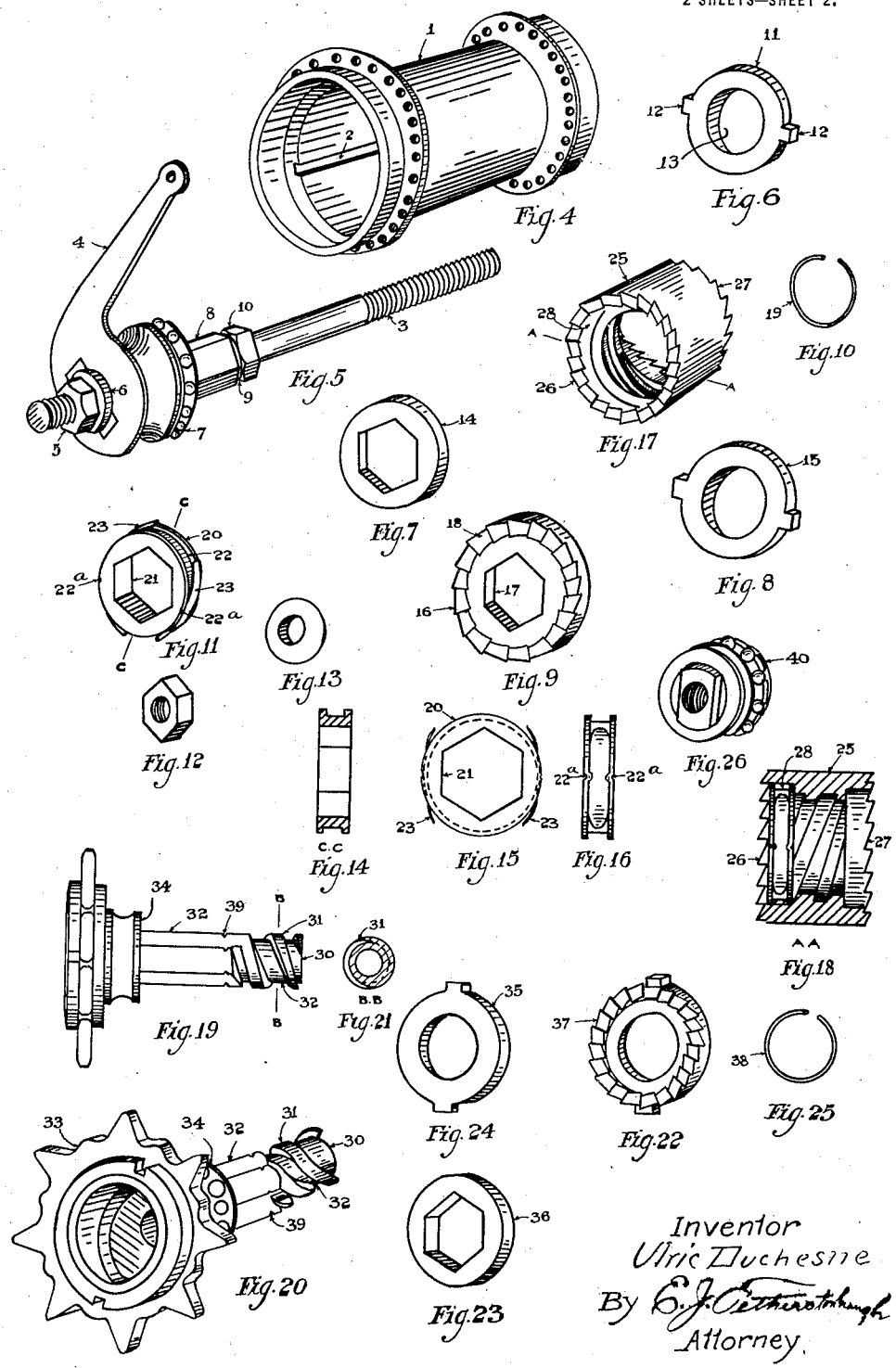

1,356,052.

Patented Oct. 19, 1920.
2 SHEETS—SHEET 1.

Inventor
Ulric Duchesne
By
Attorney

UNITED STATES PATENT OFFICE.

ULRIC DUCHESNE, OF MONTREAL, QUEBEC, CANADA.

COASTER-BRAKE.

1,356,052.  Specification of Letters Patent.  Patented Oct. 19, 1920.

Application filed January 24, 1920. Serial No. 353,810.

*To all whom it may concern:*

Be it known that I, ULRIC DUCHESNE, a subject of the King of Great Britain, and residing at 186 St. André street, in the city and district of Montreal, in the Province of Quebec, in the Dominion of Canada, have invented a new and useful Coaster-Brake, of which the following is the specification.

The invention relates to coaster brakes, as described in the present specification and illustrated in the accompanying drawings that form part of the same.

The invention consists essentially in the novel means employed, whereby friction disks are congregated in a peculiar manner at each end of an operating nut screw driven to and from said disks and whereby the said nut is flexibly held from rotation during the operation of said screw.

The objects of the invention are to devise a new form of mechanism for coaster brakes that will eliminate the telescoping methods of application commonly employed in this class of device and also do away with the expander shoe, which has been the usual method employed in connection with coaster brakes; to utilize the well known clutch mechanism in the assembly of loose and fast disks alternately and thereby afford a very secure and rigid fastening, both in the drive and in the braking operations; and generally to provide a simple, cheap and durable form of brake mechanism.

In the drawings, Figure 1 is a longitudinal sectional view of the brake.

Fig. 4 is a perspective detail of the hub.

Fig. 5 is a perspective detail of the spindle.

Fig. 6 is a perspective detail of a brake washer rotatable on the hexagon mounting of the spindle and keyed to the hub.

Fig. 7 is a perspective detail of the intermediate washer fast on the mounting.

Fig. 8 is a perspective detail of the second loose washer on the mounting and fast with the hub.

Fig. 9 is a perspective detail of the outer brake clutch member fast on the mounting of the spindle.

Fig. 10 is a detail showing a spring wire for holding said washers and clutch member in place.

Fig. 11 is a perspective detail of the friction ring fast on the mounting of the spindle beyond the spring keeper.

Fig. 12 is a retaining nut on the spindle.

Fig. 13 is a washer between the retaining nut illustrated in Fig. 12 and the bracket for holding the brake to the bicycle frame.

Fig. 14 is a cross sectional view of the friction ring illustrated in Fig. 11.

Fig. 15 is a side elevation of the friction ring illustrated in Fig. 11.

Fig. 16 is an end elevation of the friction ring illustrated in Fig. 11.

Fig. 17 is a perspective detail of the operating nut.

Fig. 18 is a longitudinal sectional view of the operating nut on the line A—A in Fig. 17, and showing the friction ring mounted therein.

Fig. 19 is a side elevation of the driving screw.

Fig. 20 is a perspective detail of the driving screw.

Fig. 21 is a cross sectional view of the driving screw on the line B—B in Fig. 19.

Fig. 22 is a perspective detail of the clutch member of the drive congregation of disks or washers loosely mounted on the hexagon sleeve forming the shank of the driving screw and keyed in the hub.

Fig. 23 is the intermediate washer of the driving group fast on the hexagon sleeve of the driver.

Fig. 24 is a perspective detail of the inner washer loose on the hexagon sleeve and fast with the hub and engaging the hub of the driver.

Fig. 25 is a detail of the keeper spring for the driver group.

Fig. 26 is a perspective detail of the sprocket wheel ball bearing.

Like numerals of reference indicate corresponding parts in each figure.

Figure 1:
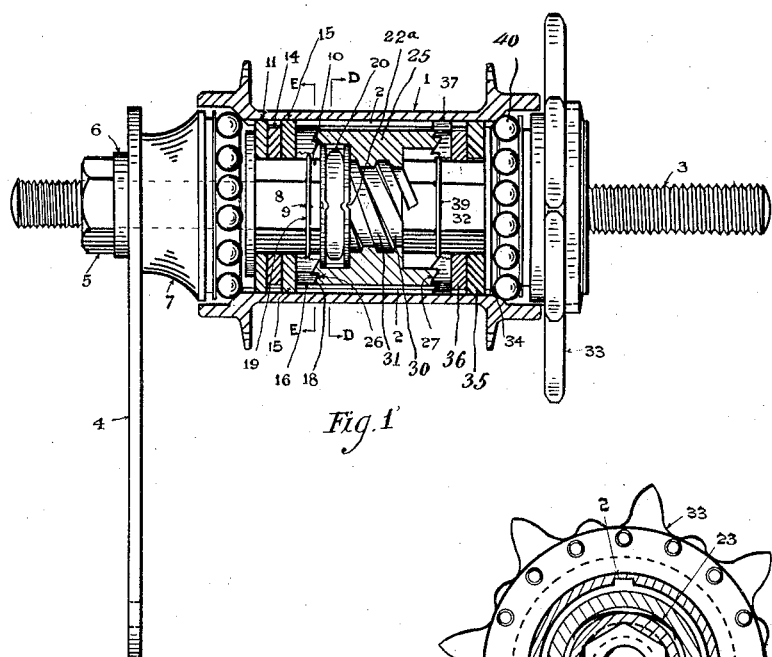
Figure 2:
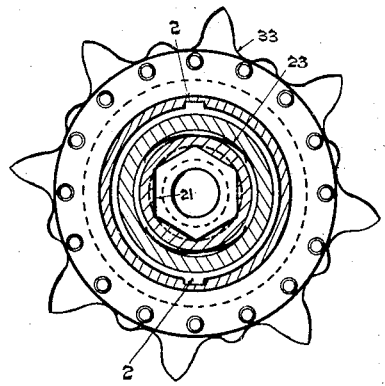
Fig. 2 is a cross sectional view on the line D—D in Fig. 1.
Figure 3:
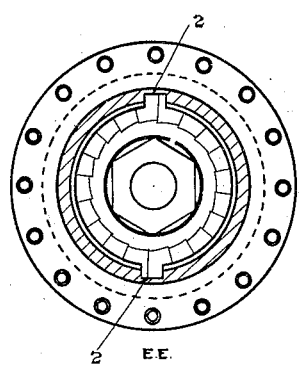
Fig. 3 is a cross sectional view on the line E—E in Fig. 1.

Referring to the drawings, the tubular hub 1 is here shown in the shape of the hub usual in the construction of bicycles and having the keyways 2. The threaded spindle 3 extends longitudinally through the hub 1 and at its inner end carries the bracket 4, which rigidly secures the spindle 3 to the frame of the bicycle, said bracket being held in place by the nut 5 tightening on the washer 6. The bracket 4 is held tightly up against the mounting 7, which encircles the spindle 3 and is fast thereto and is formed with the hexagon extension 8 along the spindle, the said hexagon extension having adjacent to the end thereof, the keeper spring slot 9 dividing the friction ring mounting 10 from the remainder of the hexagon extension 8.

The friction disk or washer 11, formed with the keys 12 engaging in the keyways 2, and with the central circular hole 13 turns freely on the hexagon extension 8. The intermediate washer 14 has the hexagon center on the hexagon extension 8 and in rotation is therefore fast with said hexagon extension. The next disk or washer 15 is keyed to the hub and turns freely on the hexagon extension, similar to the washer 11. The ratchet clutch member 16 is formed with the hexagon center 17 mounted on the hexagon extension 8 and therefore fast therewith in rotation and has the ratchet teeth 18, which extend outwardly therefrom. The keeper ring 19 is sprung into the slot 9 and retains the ratchet 16 and consequently the remaining disks of the brake congregation on the hexagon extension 8.

The friction ring 20 is formed with the hexagon center 21 and the annular groove 22, the leaf springs 23 being placed in said groove 22 at diametrically opposite points and held therein by burring in the wall of said groove from each side as at 22ª. The operating nut 25 is formed at the ends with the ratchet teeth 26 and 27, respectively, for the brake and drive congregation of disks and at the brake end has the friction ring socket 28, which fits closely to the friction ring 20 and as the friction ring is non-rotative on its own mounting 10, the nut will be held also from rotation to the extent of the friction of said ring on the inner surface of the socket portion 28 of the nut, this friction being increased by the springs 23 and further increased by packing, if desired, in the groove 22, or it may be held by packing entirely in said groove.

The central inner portion of the nut 25 is threaded and engaged by the driving screw 30, which is here shown with the double thread 31 and the shank 32 in the form of a hexagon sleeve turning on the spindle 3 and carrying at the end thereof the sprocket wheel 33 or other means of driving, and the wheel hub 34 forming an abutment for the friction disks.

The disk or washer 35 is loosely mounted on the hexagon sleeve 32 and is keyed to the hub 1, while it engages the sprocket wheel hub or abutment 34. The intermediate disk or washer 36 has a hexagon center and is fast with the hexagon sleeve 32 in rotation. The ratchet clutch member 37 is the outer disk and is keyed to the hub 1 and loose on the hexagon sleeve 32, but is engaged by the nut 25. The two disks and ratchet clutch member are held on the hexagon sleeve 32 by means of the keeper spring 38 in the slots 39 in said hexagon sleeve. 40 is simply a ball bearing for the sprocket wheel hub, which is well known in the art of manufacturing coaster brakes.

In the operation of this invention, the sprocket wheel 33 is customarily connected to a driving sprocket operated by a crank with the foot pedal. It is hardly necessary to describe all this herein, because it is so very well known, it is merely mentioned because there may be other ways of driving the screw than the sprocket shown, however for purposes of explanation, let it be as shown, that is to say, the driver has the hexagon sleeve 32 terminating in the screw 30 with the double thread 31, while on the outer end it carries the sprocket wheel and driving abutment 34 forming part of the hub of said sprocket wheel. It will be seen that ordinarily the driving and brake disks or washers are free, for the operating nut will not engage either the driver group or the brake group without pressure being brought to bear and the sprocket wheel turned. In the turning of the sprocket wheel forwardly, which is the usual operation of driving the bicycle forwardly, the driving screw 30 turns in the nut and as the said nut is held from rotation by the friction ring, the nut will be drawn to the outer toothed disk of the driving group and the ratchet teeth 27 of the nut will engage the ratchet teeth of the disk, and at the same time press heavily against said disk, with the consequence that the intermediate washer 36, which is fast on the hexagon sleeve 32, comes into contact with the inside loose washer 35, which is fast with the hub and as this last loose washer is held against the abutment by the intermediate washer, the connection between the hexagon sleeve and the tubular hub is at once established, thereby driving the wheel of the bicycle, which is built up from the said hub.

The moment the pressure is relieved, the disks automatically relieve themselves, so that the bicycle wheel turns idly in respect to the sprocket wheel and when back pressure is brought to bear on the pedal, the screw of the driver turns in an opposite direction and this drives the nut into engagement with the clutch disk 16 of the brake group and as this clutch disk is fast on the hexagon mounting 8 and the latter is fixed in relation to the frame of the bicycle, the engagement of the said clutch disk with the members of the brake 15, 14 and 11 group and the abutment formed by the end of the mounting 7 establishes the connection between the fixed hexagon mounting and the tubular hub, thereby retarding or stopping the rotation of the bicycle wheel.

This brake mechanism contains many features in which slight variations may be made without departing from the spirit of the invention, but it may be said generally that the common device of friction disk washers is applied to the coaster brake mechanism in a peculiar way, and while it is not claimed in this application that there is novelty in the application of friction disks for the purpose of driving or braking, yet it is claimed that the peculiar method herein employed is novel and the scope in regard to its use, so far as the protection is concerned, is only limited by the claim for novelty following.

What I claim is:—

In a coaster brake, a sleeve hub, a spindle stationary in relation to said hub, a polygonal fixed mounting on said spindle, brake members forming a unit through the contact of their vertical parallel faces and on said mounting, a friction ring non-rotative on said mounting and having an annular groove therein and resilient friction member in said groove, a driver having a polygonal sleeve portion terminating in a double thread screw and rotatively mounted on said spindle, a nut engaged by said screw and having a socket end for said friction ring, and a plurality of driver members forming a unit by the contact of their vertical and parallel faces and laterally movable on said polygonal sleeve portion, said brake members and driver members being in slidable coöperation with the movements of the nut.

Signed at the city of Montreal, Province of Quebec, Dominion of Canada, this 20th day of January, 1920.

ULRIC DUCHESNE.